(12) United States Patent
Wu et al.

(10) Patent No.: US 8,861,237 B2
(45) Date of Patent: Oct. 14, 2014

(54) POWER SUPPLY APPARATUS

(71) Applicant: Chicony Power Technology Co., Ltd., New Taipei (TW)

(72) Inventors: Zhen-Yuan Wu, New Taipei (TW); Tim-Cheung Leung, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 92 days.

(21) Appl. No.: 13/749,347

(22) Filed: Jan. 24, 2013

(65) Prior Publication Data

US 2014/0204639 A1 Jul. 24, 2014

(51) Int. Cl.
*H02M 7/04* (2006.01)
*H02M 7/217* (2006.01)

(52) U.S. Cl.
CPC ..................... *H02M 7/217* (2013.01)
USPC ............................. 363/89; 323/222

(58) Field of Classification Search
CPC ......... H02M 1/42; H02M 7/003; H02M 7/02; H02M 7/12; H02M 2001/0022
USPC ................... 323/222; 363/84, 89, 90
See application file for complete search history.

(56) References Cited

U.S. PATENT DOCUMENTS

| | | | |
|---|---|---|---|
| 5,019,952 A * | 5/1991 | Smolenski et al. ............. 363/16 |
| 7,723,964 B2 * | 5/2010 | Taguchi ........................ 323/222 |
| 8,159,842 B2 * | 4/2012 | Chen et al. ...................... 363/49 |
| 2004/0047166 A1 * | 3/2004 | Lopez-Santillana et al. ... 363/89 |
| 2007/0051712 A1 * | 3/2007 | Kooken et al. .............. 219/130.1 |
| 2007/0058402 A1 * | 3/2007 | Shekhawat et al. ............. 363/89 |
| 2009/0116269 A1 * | 5/2009 | Yegnashankaran et al. .... 363/84 |
| 2011/0043133 A1 * | 2/2011 | Van Laanen et al. ......... 315/294 |
| 2012/0224401 A1 * | 9/2012 | Phadke ........................... 363/84 |
| 2013/0342139 A1 * | 12/2013 | Shimomugi et al. ....... 318/400.3 |

* cited by examiner

*Primary Examiner* — Gary L Laxton
*Assistant Examiner* — Kyle J Moody
(74) *Attorney, Agent, or Firm* — Muncy, Geissler, Olds & Lowe, P.C.

(57) ABSTRACT

A power supply apparatus mainly includes a secondary side controller, a digital isolator, a plurality of isolation sensing units, and a driving unit. The secondary side controller is configured to isolatedly measure voltages and currents, and is configured to isolatedly control the driving unit. The power supply apparatus includes a controller only, i.e. the secondary side controller 114. Therefore, the power consumption is lower, and the cost is lower. Only one controller is required to update software. There is no communication delay problem between two controllers.

10 Claims, 6 Drawing Sheets

POWER SUPPLY APPARATUS

BACKGROUND OF THE INVENTION

1. Field of the Invention

The present invention relates to a power supply apparatus, and especially relates to an improved power supply apparatus.

2. Description of the Related Art

An alternating current power is transferred into a direct current power by a power supply apparatus. An electronic apparatus is driven by the direct current power.

A related art power supply apparatus includes a primary side controller and a secondary side controller. Therefore, the related art power supply apparatus includes two controllers.

However, two controllers will cause higher power consumption and higher cost. Besides, each of the controllers is required to update software respectively. Moreover, there are communication delay problems between the two controllers.

SUMMARY OF THE INVENTION

In order to solve the above-mentioned problems, an object of the present invention is to provide a power supply apparatus.

In order to achieve the object of the present invention mentioned above, the power supply apparatus is applied to an alternating current power supply apparatus and a load apparatus. The power supply apparatus includes a first connection point, a second connection point, a third connection point, a fourth connection point, a current sensing unit, a fifth connection point, a secondary side controller, a digital isolator, a first isolation sensing unit, a second isolation sensing unit, a third isolation sensing unit, a fourth isolation sensing unit, a driving unit, a first capacitor, a bridge rectifier, a second capacitor, an inductor, and a switch unit.

The first connection point is electrically connected to the alternating current power supply apparatus. The second connection point is electrically connected to the alternating current power supply apparatus. The fourth connection point is electrically connected to the load apparatus. The fifth connection point is electrically connected to the load apparatus. The secondary side controller is electrically connected to the current sensing unit. The digital isolator is electrically connected to the secondary side controller. The first isolation sensing unit is electrically connected to the digital isolator, the secondary side controller, and the first connection point. The second isolation sensing unit is electrically connected to the digital isolator, the secondary side controller, and the second connection point. The third isolation sensing unit is electrically connected to the digital isolator, the secondary side controller, and the third connection point. The fourth isolation sensing unit is electrically connected to the digital isolator, the secondary side controller, and the fourth connection point. The driving unit is electrically connected to the digital isolator. The first capacitor is electrically connected to the first connection point and the second connection point. The bridge rectifier is electrically connected to the first connection point, the second connection point, the third connection point, and the fifth connection point. The second capacitor is electrically connected to the third connection point and the fifth connection point. The inductor is electrically connected to the third connection point and the current sensing unit. The switch unit is electrically connected to the current sensing unit, the fifth connection point, and the driving unit.

DETAILED DESCRIPTION OF THE INVENTION

Figure 1:
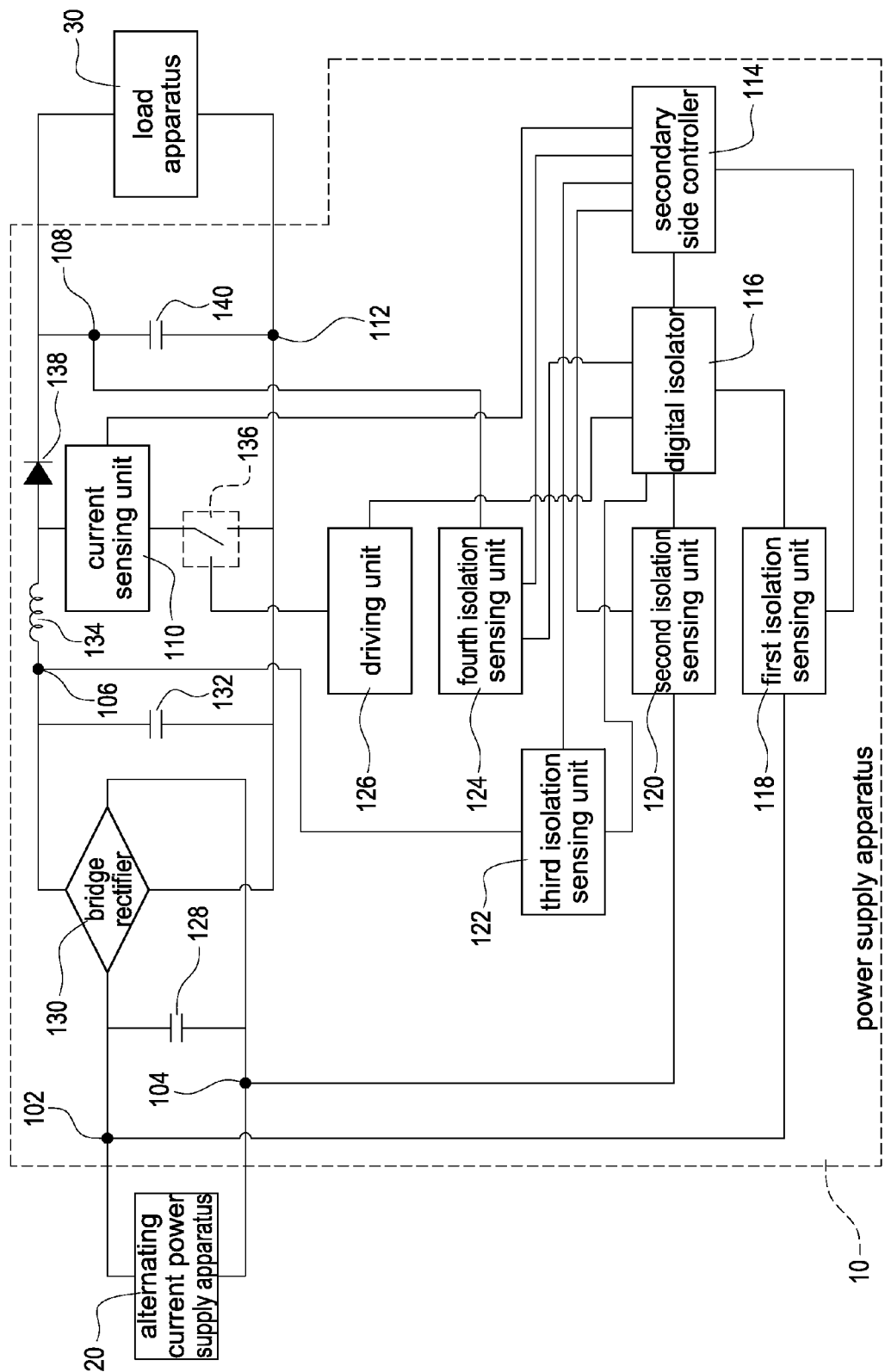
FIG. 1 shows a block diagram of the power supply apparatus of the present invention.

FIG. 1 shows a block diagram of the power supply apparatus of the present invention. A power supply apparatus 10 is applied to an alternating current power supply apparatus 20 and a load apparatus 30.

The power supply apparatus 10 includes a first connection point 102, a second connection point 104, a third connection point 106, a fourth connection point 108, a current sensing unit 110, a fifth connection point 112, a secondary side controller 114, a digital isolator 116, a first isolation sensing unit 118, a second isolation sensing unit 120, a third isolation sensing unit 122, a fourth isolation sensing unit 124, a driving unit 126, a first capacitor 128, a bridge rectifier 130, a second capacitor 132, an inductor 134, a switch unit 136, a diode 138, and a third capacitor 140.

The first connection point 102 is electrically connected to the alternating current power supply apparatus 20, the bridge rectifier 130, the first capacitor 128, and the first isolation sensing unit 118. The second connection point 104 is electrically connected to the alternating current power supply apparatus 20, the bridge rectifier 130, the first capacitor 128, and the second isolation sensing unit 120. The third connection point 106 is electrically connected to the bridge rectifier 130, the second capacitor 132, the inductor 134, and the third isolation sensing unit 122.

The fourth connection point 108 is electrically connected to the diode 138, the load apparatus 30, the third capacitor 140, and the fourth isolation sensing unit 124. The current sensing unit 110 is electrically connected to the inductor 134, the diode 138, the switch unit 136, and the secondary side controller 114. The fifth connection point 112 is electrically connected to the load apparatus 30, the third capacitor 140, the bridge rectifier 130, the second capacitor 132, and the switch unit 136.

The digital isolator 116 is electrically connected to the first isolation sensing unit 118, the second isolation sensing unit 120, the third isolation sensing unit 122, the fourth isolation sensing unit 124, the driving unit 126, and the secondary side controller 114. The secondary side controller 114 is electrically connected to the first isolation sensing unit 118, the second isolation sensing unit 120, the third isolation sensing unit 122, and the fourth isolation sensing unit 124. The driving unit 126 is electrically connected to the switch unit 136.

A direct current power (not shown in FIG. 1) is outputted from the power supply apparatus 10 to the load apparatus 30 after an alternating current power (not shown in FIG. 1) outputted from the alternating current power supply apparatus 20 is processed by the first capacitor 128, the bridge rectifier 130, the second capacitor 132, the inductor 134, the switch unit 136, the diode 138, and the third capacitor 140.

Moreover, the secondary side controller 114 is configured to control the driving unit 126 through the digital isolator 116 to control the switch unit 136. The switch unit 136 is controlled by the driving unit 126 with pulse width modulation signals. The switch unit 136 is, for example, a transistor switch. The power supply apparatus 10 is configured to measure voltages and currents to derive powers without turning on a power factor correction (PFC) circuit. The current sensing unit 110 is, for example, a current transformer.

Figure 2:
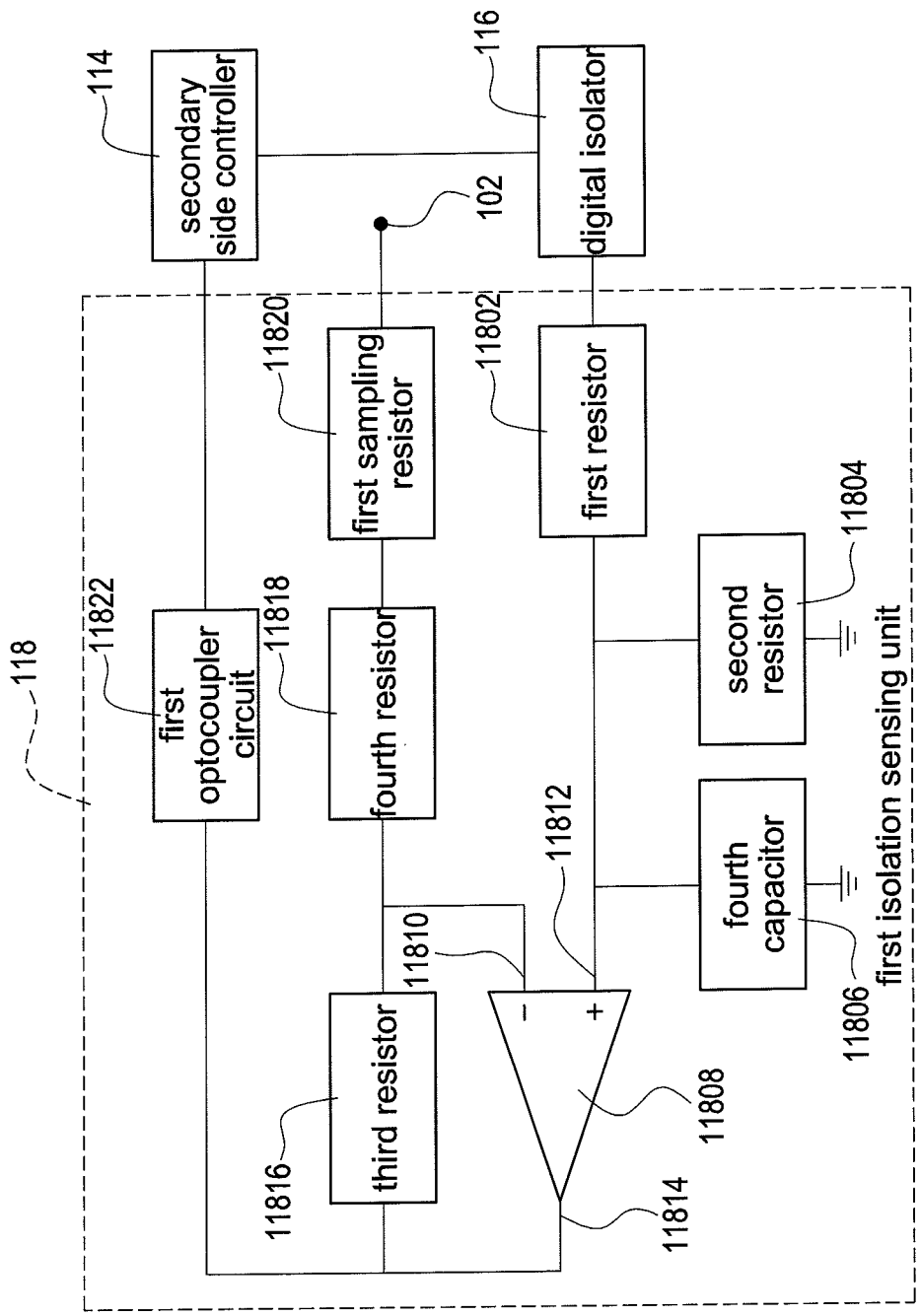
FIG. 2 shows a block diagram of the first isolation sensing unit of the present invention.

FIG. 2 shows a block diagram of the first isolation sensing unit of the present invention. The first isolation sensing unit 118 includes a first resistor 11802, a second resistor 11804, a fourth capacitor 11806, a first operational amplifier 11808, a third resistor 11816, a fourth resistor 11818, a first sampling resistor 11820, and a first optocoupler circuit 11822. The first operational amplifier 11808 includes an inverting input node 11810, a non-inverting input node 11812, and an output node 11814.

The output node 11814 of the first operational amplifier 11808 is electrically connected to the third resistor 11816 and the first optocoupler circuit 11822. The inverting input node 11810 of the first operational amplifier 11808 is electrically connected to the third resistor 11816 and the fourth resistor 11818. The non-inverting input node 11812 of the first operational amplifier 11808 is electrically connected to the first resistor 11802, the second resistor 11804, and the fourth capacitor 11806. The secondary side controller 114 is electrically connected to the first optocoupler circuit 11822 and the digital isolator 116. The first resistor 11802 is electrically connected to the digital isolator 116. The first sampling resistor 11820 is electrically connected to the fourth resistor 11818 and the first connection point 102.

The secondary side controller 114 is configured to supply a reference voltage (not shown in FIG. 2) to the first resistor 11802 of the first isolation sensing unit 118 through the digital isolator 116. After signals at the first connection point 102 are sampled by the first sampling resistor 11820, the signals at the first connection point 102 are processed by the first resistor 11802, the second resistor 11804, the fourth capacitor 11806, the first operational amplifier 11808, the third resistor 11816, and the fourth resistor 11818. Finally, the secondary side controller 114 receives the above-mentioned processed signals through the first optocoupler circuit 11822.

Figure 3:
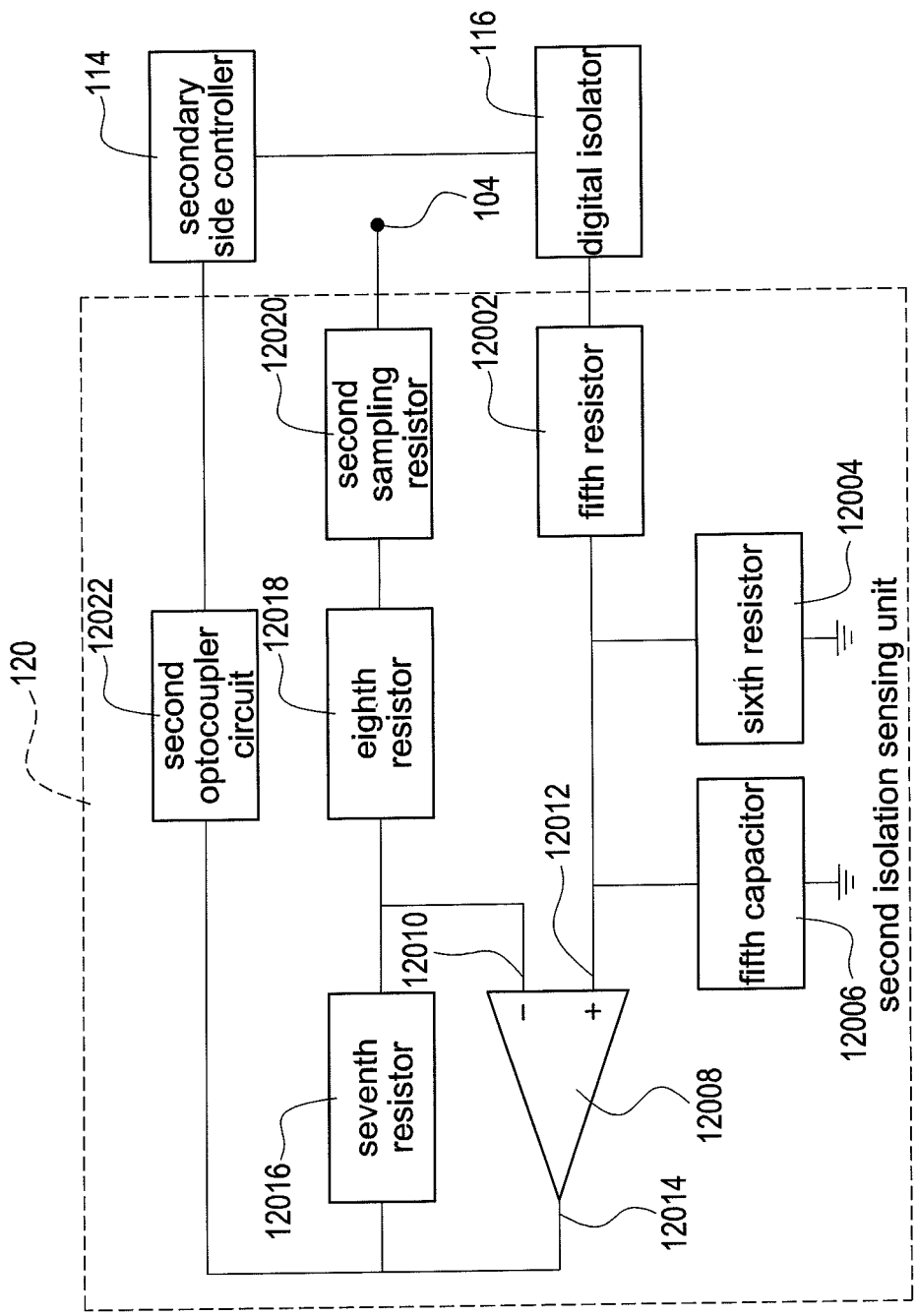
FIG. 3 shows a block diagram of the second isolation sensing unit of the present invention.

FIG. 3 shows a block diagram of the second isolation sensing unit of the present invention. The second isolation sensing unit 120 includes a fifth resistor 12002, a sixth resistor 12004, a fifth capacitor 12006, a second operational amplifier 12008, a seventh resistor 12016, an eighth resistor 12018, a second sampling resistor 12020, and a second optocoupler circuit 12022. The second operational amplifier 12008 includes an inverting input node 12010, a non-inverting input node 12012, and an output node 12014.

Figure 4:
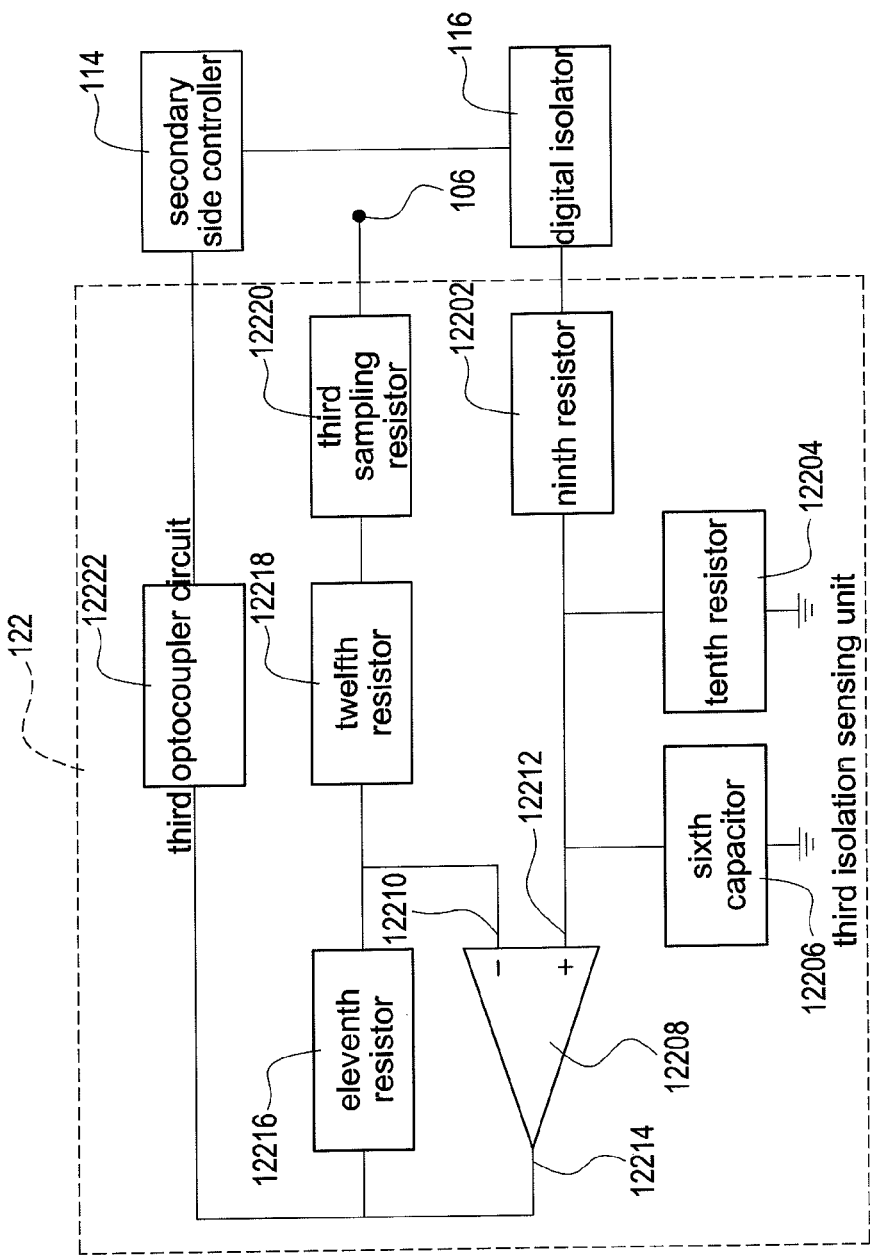
FIG. 4 shows a block diagram of the third isolation sensing unit of the present invention.

FIG. 4 shows a block diagram of the third isolation sensing unit of the present invention. The third isolation sensing unit 122 includes a ninth resistor 12202, a tenth resistor 12204, a sixth capacitor 12206, a third operational amplifier 12208, an eleventh resistor 12216, a twelfth resistor 12218, a third sampling resistor 12220, and a third optocoupler circuit 12222. The third operational amplifier 12208 includes an inverting input node 12210, a non-inverting input node 12212, and an output node 12214.

Figure 5:
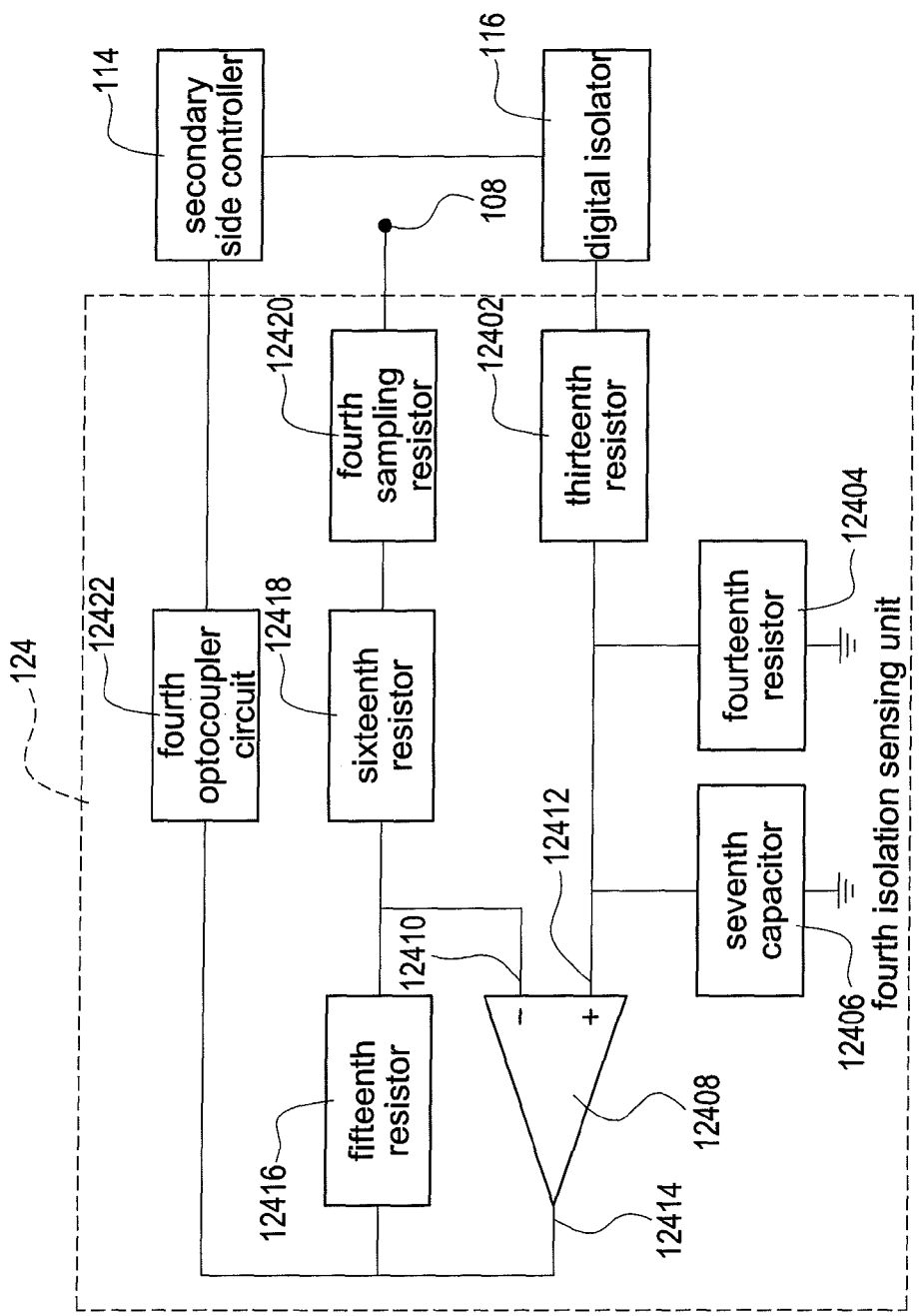
FIG. 5 shows a block diagram of the fourth isolation sensing unit of the present invention.

FIG. 5 shows a block diagram of the fourth isolation sensing unit of the present invention. The fourth isolation sensing unit 124 includes a thirteenth resistor 12402, a fourteenth resistor 12404, a seventh capacitor 12406, a fourth operational amplifier 12408, a fifteenth resistor 12416, a sixteenth resistor 12418, a fourth sampling resistor 12420, and a fourth optocoupler circuit 12422. The fourth operational amplifier 12408 includes an inverting input node 12410, a non-inverting input node 12412, and an output node 12414.

Electrical connections and processes of the second isolation sensing unit 120, the third isolation sensing unit 122, and the fourth isolation sensing unit 124 are similar to the electrical connections and the processes of the first isolation sensing unit 118 shown in FIG. 2. Therefore, it is omitted.

Figure 6:
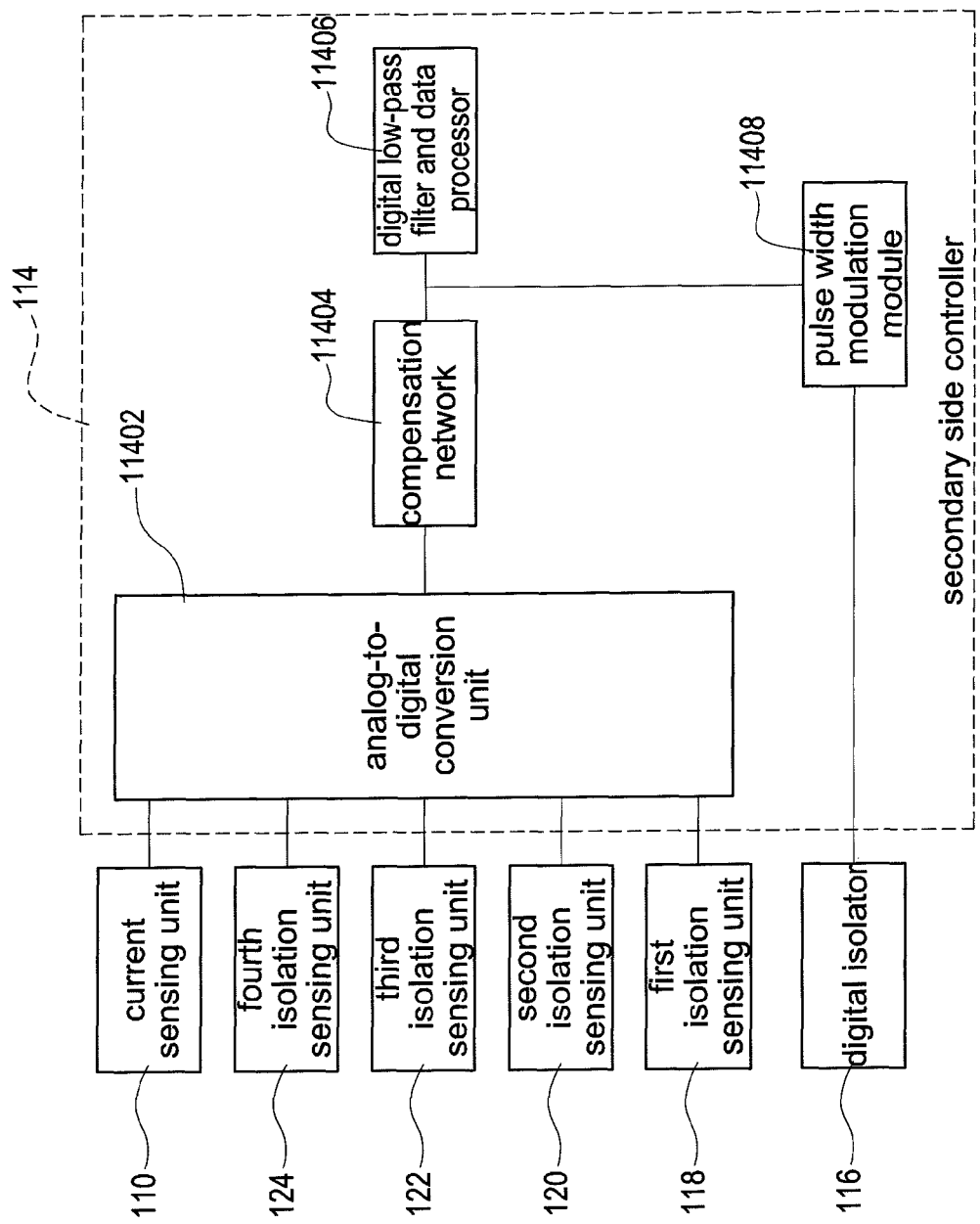
FIG. 6 shows a block diagram of the secondary side controller of the present invention.

FIG. 6 shows a block diagram of the secondary side controller of the present invention. The secondary side controller 114 includes an analog-to-digital conversion unit 11402, a compensation network 11404, a digital low-pass filter and data processor 11406, and a pulse width modulation module 11408.

The analog-to-digital conversion unit 11402 is electrically connected to the first isolation sensing unit 118, the second isolation sensing unit 120, the third isolation sensing unit 122, the fourth isolation sensing unit 124, the current sensing unit 110, and the compensation network 11404. The pulse width modulation module 11408 is electrically connected to the compensation network 11404, the digital low-pass filter and data processor 11406, and the digital isolator 116.

The digital low-pass filter and data processor 11406 is configured to process data sent from a primary side of the power supply apparatus 10, and is configured to control a secondary side of the power supply apparatus 10.

The related art power supply apparatus includes two controllers. Therefore, the power consumption is higher, and the cost is higher. Each of the controllers is required to update software respectively. There are communication delay problems between the two controllers. However, the power supply apparatus 10 of the present invention includes a controller only (the secondary side controller 114). Therefore, the power consumption is lower, and the cost is lower. Only one controller is required to update software. There is no communication delay problem between two controllers. The secondary side controller 114 is configured to isolatedly measure the voltages and the currents, and is configured to isolatedly control the driving unit 126.

Moreover, the present invention further includes following two features:

1. The input voltages and currents in the primary side of the power supply can be sent without turning on the main power conversion circuit (such as the PFC circuit).

2. The secondary side controller 114 is, for example, a digital apparatus, an analog apparatus, or a dedicated ASIC.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A power supply apparatus applied to an alternating current power supply apparatus and a load apparatus, the power supply apparatus including
a first connection point electrically connected to the alternating current power supply apparatus;
a second connection point electrically connected to the alternating current power supply apparatus;
a third connection point;
a fourth connection point electrically connected to the load apparatus;
a current sensing unit;
a fifth connection point electrically connected to the load apparatus;
a secondary side controller electrically connected to the current sensing unit;

a digital isolator electrically connected to the secondary side controller;
a first isolation sensing unit electrically connected to the digital isolator, the secondary side controller, and the first connection point;
a second isolation sensing unit electrically connected to the digital isolator, the secondary side controller, and the second connection point;
a third isolation sensing unit electrically connected to the digital isolator, the secondary side controller, and the third connection point;
a fourth isolation sensing unit electrically connected to the digital isolator, the secondary side controller, and the fourth connection point;
a driving unit electrically connected to the digital isolator;
a first capacitor electrically connected to the first connection point and the second connection point;
a bridge rectifier electrically connected to the first connection point, the second connection point, the third connection point, and the fifth connection point;
a second capacitor electrically connected to the third connection point and the fifth connection point;
an inductor electrically connected to the third connection point and the current sensing unit; and
a switch unit electrically connected to the current sensing unit, the fifth connection point, and the driving unit.

2. The power supply apparatus in claim 1, further including:
a diode electrically connected to the current sensing unit and the fourth connection point; and
a third capacitor electrically connected to the fourth connection point and the fifth connection point.

3. The power supply apparatus in claim 2, wherein the first isolation sensing unit includes:
a first resistor electrically connected to the digital isolator;
a second resistor electrically connected to the first resistor;
a fourth capacitor electrically connected to the first resistor;
a first operational amplifier including an inverting input node, a non-inverting input node, and an output node, the non-inverting input node of the first operational amplifier electrically connected to the first resistor;
a third resistor electrically connected to the inverting input node of the first operational amplifier and the output node of the first operational amplifier;
a fourth resistor electrically connected to the third resistor;
a first sampling resistor electrically connected to the fourth resistor and the first connection point; and
a first optocoupler circuit electrically connected to the output node of the first operational amplifier and the secondary side controller.

4. The power supply apparatus in claim 3, wherein the second isolation sensing unit includes:
a fifth resistor electrically connected to the digital isolator;
a sixth resistor electrically connected to the fifth resistor;
a fifth capacitor electrically connected to the fifth resistor;
a second operational amplifier including an inverting input node, a non-inverting input node, and an output node, the non-inverting input node of the second operational amplifier electrically connected to the fifth resistor;
a seventh resistor electrically connected to the inverting input node of the second operational amplifier and the output node of the second operational amplifier;
an eighth resistor electrically connected to the seventh resistor;
a second sampling resistor electrically connected to the eighth resistor and the second connection point; and
a second optocoupler circuit electrically connected to the output node of the second operational amplifier and the secondary side controller.

5. The power supply apparatus in claim 4, wherein the third isolation sensing unit includes:
a ninth resistor electrically connected to the digital isolator;
a tenth resistor electrically connected to the ninth resistor;
a sixth capacitor electrically connected to the ninth resistor;
a third operational amplifier including an inverting input node, a non-inverting input node, and an output node, the non-inverting input node of the third operational amplifier electrically connected to the ninth resistor;
an eleventh resistor electrically connected to the inverting input node of the third operational amplifier and the output node of the third operational amplifier;
a twelfth resistor electrically connected to the eleventh resistor;
a third sampling resistor electrically connected to the twelfth resistor and the third connection point; and
a third optocoupler circuit electrically connected to the output node of the third operational amplifier and the secondary side controller.

6. The power supply apparatus in claim 5, wherein the fourth isolation sensing unit includes:
a thirteenth resistor electrically connected to the digital isolator;
a fourteenth resistor electrically connected to the thirteenth resistor;
a seventh capacitor electrically connected to the thirteenth resistor;
a fourth operational amplifier including an inverting input node, a non-inverting input node, and an output node, the non-inverting input node of the fourth operational amplifier electrically connected to the thirteenth resistor;
a fifteenth resistor electrically connected to the inverting input node of the fourth operational amplifier and the output node of the fourth operational amplifier;
a sixteenth resistor electrically connected to the fifteenth resistor;
a fourth sampling resistor electrically connected to the sixteenth resistor and the fourth connection point; and
a fourth optocoupler circuit electrically connected to the output node of the fourth operational amplifier and the secondary side controller.

7. The power supply apparatus in claim 6, wherein the secondary side controller includes:
an analog-to-digital conversion unit electrically connected to the first isolation sensing unit, the second isolation sensing unit, the third isolation sensing unit, the fourth isolation sensing unit, and the current sensing unit.

8. The power supply apparatus in claim 7, wherein the secondary side controller further includes:
a compensation network electrically connected to the analog-to-digital conversion unit.

9. The power supply apparatus in claim 8, wherein the secondary side controller further includes:
a digital low-pass filter and data processor electrically connected to the compensation network.

10. The power supply apparatus in claim 9, wherein the secondary side controller further includes:
a pulse width modulation module electrically connected to the compensation network, the digital low-pass filter and data processor, and the digital isolator.

* * * * *